(12) United States Patent
Hatch et al.

(10) Patent No.: US 10,986,185 B1
(45) Date of Patent: Apr. 20, 2021

(54) MANAGING FUNCTIONALITY OF MULTIPLE DEVICES VIA A DELTA PROXY

(71) Applicant: SaltStack, Inc., Lehi, UT (US)

(72) Inventors: Thomas S. Hatch, Lehi, UT (US); Charles R. Oldham, Layton, UT (US)

(73) Assignee: SALTSTACK, INC., Lehi, UT (US)

( * ) Notice: Subject to any disclaimer, the term of this patent is extended or adjusted under 35 U.S.C. 154(b) by 0 days.

(21) Appl. No.: 16/194,109

(22) Filed: Nov. 16, 2018

Related U.S. Application Data (60) Provisional application No. 62/729,021, filed on Sep. 10, 2018.

(51) Int. Cl.
*H04L 29/08* (2006.01)
*H04L 12/24* (2006.01)

(52) U.S. Cl.
CPC ............ *H04L 67/125* (2013.01); *H04L 41/12* (2013.01)

(58) Field of Classification Search
CPC ... H04L 67/125; H04L 41/12; H04L 41/0809; H04L 41/00; H04L 29/08387; H04L 29/08567; H04L 61/20; H04L 67/1059; H04L 67/34; H04W 76/00; G06F 3/122
See application file for complete search history.

(56) References Cited

U.S. PATENT DOCUMENTS

| | | | | |
|---|---|---|---|---|
| 5,317,742 A * | 5/1994 | Bapat | ..................... | G06F 16/289 707/714 |
| 5,764,955 A * | 6/1998 | Doolan | ................ | H04L 41/0213 709/223 |
| 7,970,943 B2 * | 6/2011 | Lin | ........................ | G06F 16/258 709/246 |
| 8,161,168 B2 * | 4/2012 | Lankford | ................ | H04L 45/00 709/203 |
| 10,142,122 B1 * | 11/2018 | Hill | ...................... | H04L 12/2807 |
| 2002/0116454 A1 * | 8/2002 | Dyla | ...................... | G06Q 30/06 709/203 |
| 2005/0108369 A1 * | 5/2005 | Sather | ................... | G06F 9/4411 709/220 |
| 2006/0265508 A1 * | 11/2006 | Angel | ............... | H04L 29/12047 709/230 |
| 2010/0217837 A1 * | 8/2010 | Ansari | .................... | G06F 16/64 709/218 |
| 2010/0324962 A1 * | 12/2010 | Nesler | ................ | G06Q 30/0206 705/7.36 |

(Continued)

*Primary Examiner* — Michael Won
(74) *Attorney, Agent, or Firm* — Hanley, Flight & Zimmerman, LLC (57) ABSTRACT

The present disclosure relates to systems, methods, and computer-readable media for implementing a device management system that controls a plurality of remotely managed computing devices by way of one or more delta proxies. The systems disclosed herein can set up, generate, or otherwise implement a delta proxy that includes interfaces for facilitating communication between a master control system and any number of managed devices. The systems disclosed herein can implement a delta proxy for controlling multiple managed devices via a single instance of the delta proxy. The delta proxy may include a plug-in layer including software plug-ins that facilitate control of devices of different types and functionalities. The delta proxy can additionally include a namespace layer for allocating memory on a per-device basis.

22 Claims, 5 Drawing Sheets

(56) References Cited

U.S. PATENT DOCUMENTS

| | | | |
|---|---|---|---|
| 2014/0229588 A1* | 8/2014 | Hjelm | H04L 12/2809 |
| | | | 709/220 |
| 2015/0263886 A1* | 9/2015 | Wang | H04L 41/08 |
| | | | 370/254 |
| 2015/0312176 A1* | 10/2015 | Jones | H04L 51/04 |
| | | | 709/206 |
| 2016/0087933 A1* | 3/2016 | Johnson | H04W 12/0023 |
| | | | 709/245 |
| 2018/0034913 A1* | 2/2018 | Matthieu | H04L 67/125 |
| 2019/0349426 A1* | 11/2019 | Smith | H04L 67/104 |

* cited by examiner

MANAGING FUNCTIONALITY OF MULTIPLE DEVICES VIA A DELTA PROXY

This application is related to and claims the benefit of U.S. Provisional Patent Application No. 62/729,021 filed on Sep. 10, 2018. The aforementioned application is expressly incorporated herein by reference in its entirety.

BACKGROUND

Recent years have seen rapid development in software products and electronic devices. For example, it is now common for computing devices to remotely control or otherwise manage functionality of a wide variety of electronic devices. As the number of remotely managed devices becomes more common, however, it becomes increasingly difficult to effectively communicate with and control functionality of a large number of devices, particularly where those devices include a wide range of functionality and complexity. Indeed, current solutions to manage an ever-growing number of remotely managed devices has become increasingly expensive and computationally prohibitive.

For example, while many tools exist for remotely managing electronic devices, conventional device management systems often fail to effectively utilize computing or server resources. For instance, conventional device management systems typically require a separate software programs to control each respective managed device. However, where conventional systems control functionality of tens of thousands of devices, running tens of thousands of software programs generally involves a very robust farm of computing devices to effectively operate the tens of thousands of managed devices. As a result, remotely managing devices using conventional systems has become expensive and computationally prohibitive.

These along with additional problems and issues exist with regard to conventional device management systems.

BRIEF SUMMARY

Embodiments of the present disclosure provide benefits and/or solve one or more of the foregoing and other problems in the art with systems, methods, and computer-readable media for implementing a delta proxy capable of controlling functionality of multiple managed devices. In particular, in one or more embodiments, the disclosed systems implement a delta proxy including a master layer and a plug-in layer for facilitating communication of normalized data between a master device management system and a plurality of managed devices in communication with the delta proxy. Indeed, the disclosed systems can significantly reduce the number of computing devices needed to control a plurality of managed devices by enabling a single instance of a delta proxy to manage multiple devices. In addition, the delta proxy can utilize software plug-ins to add and/or remove managed devices from control by the delta proxy without interrupting operation of other devices managed using the delta proxy. Moreover, the delta proxy can utilize a namespace layer including a record of unique identifiers for the managed devices to overcome problems related to memory and namespace bleeding as a result of inefficient memory allocation.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

One or more embodiments of the present disclosure include a device management system that controls a plurality of remotely managed computing devices (or simply "managed devices") by way of one or more delta-proxies capable of controlling functionality of the managed devices over a network. For example, in one or more embodiments, a device management system can set up, generate, or otherwise implement a delta proxy that includes interfaces for communicating commands between a master control system (or simply "master system") and a number of managed devices. Indeed, the device management system can implement multiple delta proxies to each respectively control one or multiple managed devices in accordance with instructions provided by the master system. By implementing delta proxies in accordance with one or more embodiments described herein, the device management system can significantly reduce processing resources (e.g., by one or more orders of magnitude) needed to control an increasing number of managed devices.

To illustrate, in one or more embodiments, the device management system implements a delta proxy including features and functionality for controlling a plurality of managed devices. The delta proxy can include an interface that facilitates communication between the delta proxy and a master control system. The delta proxy can further include a plug-in layer including a plurality of software plug-ins that facilitate communication between the delta proxy and a plurality of managed devices (e.g., via an application programming interface (API) on the delta proxy) for controlling functionality of the plurality of managed devices (e.g., by a single instance of the delta proxy). In one or more embodiments, the delta proxy further includes a namespace layer including a record of unique identifiers mapped to namespaces for the plurality of managed devices.

As just mentioned, a delta proxy can include multiple interfaces for facilitating communication between a master system and any number of respective managed devices. For example, the delta proxy can include a master interface for receiving commands from a master system tasked with controlling a collection of managed devices of different types and functionalities. The delta proxy further includes a plug-in layer including plug-ins that normalize the variety of interfaces of the managed devices (e.g., normalizes communications or commands to be compatible across a number of different interfaces). Accordingly, where conventional systems include individual proxies having software designed specifically for interacting with unique interfaces of specific devices (or specific types of device), one or more embodiments of the delta proxies described herein include software plug-ins that normalize orders and other communications for controlling functionality of the managed devices.

Indeed, by applying, layering, or otherwise implementing multiple software plug-ins on a delta proxy, the device management system can utilize a single instance of a delta proxy to manage multiple client devices of different types and functionalities. For example, as will be described in further detail below, a delta proxy can include any number of software plug-ins for controlling multiple devices of different types. The software plug-ins can be used to control individual devices or, alternatively, can be used to control multiple devices of similar types. For example, a delta proxy can include a first software plug-in to control functionality of one or more devices of a first type as well as a second software plug-in to control functionality of one or more devices of a second type. As discussed above, by controlling multiple managed devices via a single delta proxy, the device management system can significantly reduce a number of computing devices (e.g., by one or more orders of magnitude) needed to control or otherwise manage a collection of managed devices.

In addition to enabling a delta proxy to control multiple managed devices, implementing software plug-ins in accordance with one or more embodiments enables the device management system to dynamically add or remove managed devices from a roster of devices controlled by a given delta proxy. For example, to add a new device to a set of devices controlled by the delta proxy, the device management system can layer an additional software plug-in to the plug-in layer of the delta proxy with instructions (e.g., code) for controlling the new device. Indeed, by simply adding (e.g., layering) an additional software plug-in to the plug-in layer and activating the additional plug-in, the device management system can add the new device to the set of devices controlled by the delta proxy without restarting the delta proxy or interrupting functionality the other managed devices controlled via the delta proxy.

As will be described in further detail below, the delta proxy can additionally include a namespace layer for mapping unique identifiers to namespaces for respective devices from the plurality of managed devices. For example, where conventional systems generally utilize operating system (OS) level memory isolation methods, one or more embodiments of the delta proxy creates memory (e.g., namespace) isolation on a per-device (or per-plug-in) basis by implementing a namespace layer on the delta proxy. In contrast, one or more embodiments of the delta proxy described herein include software plug-ins that create namespaces on a per-device (or per-plug-in) basis. The delta proxy further maintains a record of the namespace allocation to avoid namespace and memory bleeding that often takes place when attempting to manage operation of hundreds or thousands of managed devices.

As illustrated by the foregoing discussion, the present disclosure utilizes a variety of terms to described features and advantages of an environment including the device management system and a number of managed devices controlled via one or more delta proxies.

For instance, as used herein, a "delta proxy" refers to a software instance that acts as an intermediary between a master system (e.g., a program or system for remotely controlling a collection of managed devices over a network) and one or more managed devices. In particular, a delta proxy includes a series of interfaces (e.g., a master interface and a plug-in layer) that serves to receive commands to control various functionalities of managed devices and normalizes the commands to be compatible with different interfaces of the managed devices in a way that is transparent to the master system. Indeed, in one or more embodiments, the delta proxy appears as a managed device from the perspective of the master system, enabling the master system to provide commands that the delta proxy normalizes for communication directly to the managed devices. In one or more embodiments, the delta proxy includes a software instance that rests on the same server system as the master system tasked with controlling the managed devices.

As used herein, a "managed device" refers to any electronic or computing device that receives data and performs one or more operations in accordance with the data. For example, a managed device may receive a command to activate a functionality or configuration setting (e.g., a setting or application that affects operation of the device) of the managed device and activate the functionality of setting in accordance with the command. A managed device may refer to a variety of device types including, by way of example and not limitation, a dumb terminal capable of interpreting only a limited number of control codes or other type of terminal capable of processing more complex commands. In addition to referring to devices of different levels of complexity, different device types can also refer to different models of devices or devices having different sets of functionality. Additional detail with regard to different types of managed devices will be provided in further detail below.

As used herein, a "software plug-in" or "plug-in" may be used interchangeably to refer to a software component (e.g., a code) that adds a feature to an instance of a delta proxy related to controlling functionality of one or more managed devices. In particular, a plug-in may refer to a piece of code layered on the software instance of the delta proxy that adds the capability of the delta proxy to control functionality of a managed device associated with the plug-in. The plug-in may include an indication of one or more functions as well as a key or encryption data that enables the delta proxy to normalize a command to send to a managed device having a corresponding device interface. As will be discussed in further detail below, the plug-in may serve to control functionality of a corresponding managed device or, in some instances, enable the delta proxy to control functionality of multiple managed devices.

As used herein, a "namespace" refers to a portion or region of memory on a device (e.g., a server device) corresponding to a managed device or a given functionality of one or more managed devices. For example, a namespace may refer to an allocation of memory identified by a delta proxy and reserved for a given device or plug-in that enables a master system to issue a command to a specific device or group of managed devices. In one or more embodiments described herein a delta proxy includes a namespace layer in which a record of namespaces (e.g., mapping information) is maintained that enables the delta proxy to efficiently control multiple devices as well as conveniently add (or remove) managed devices from control by the delta proxy without causing namespace or memory bleeding on a device management system.

Figure 1:
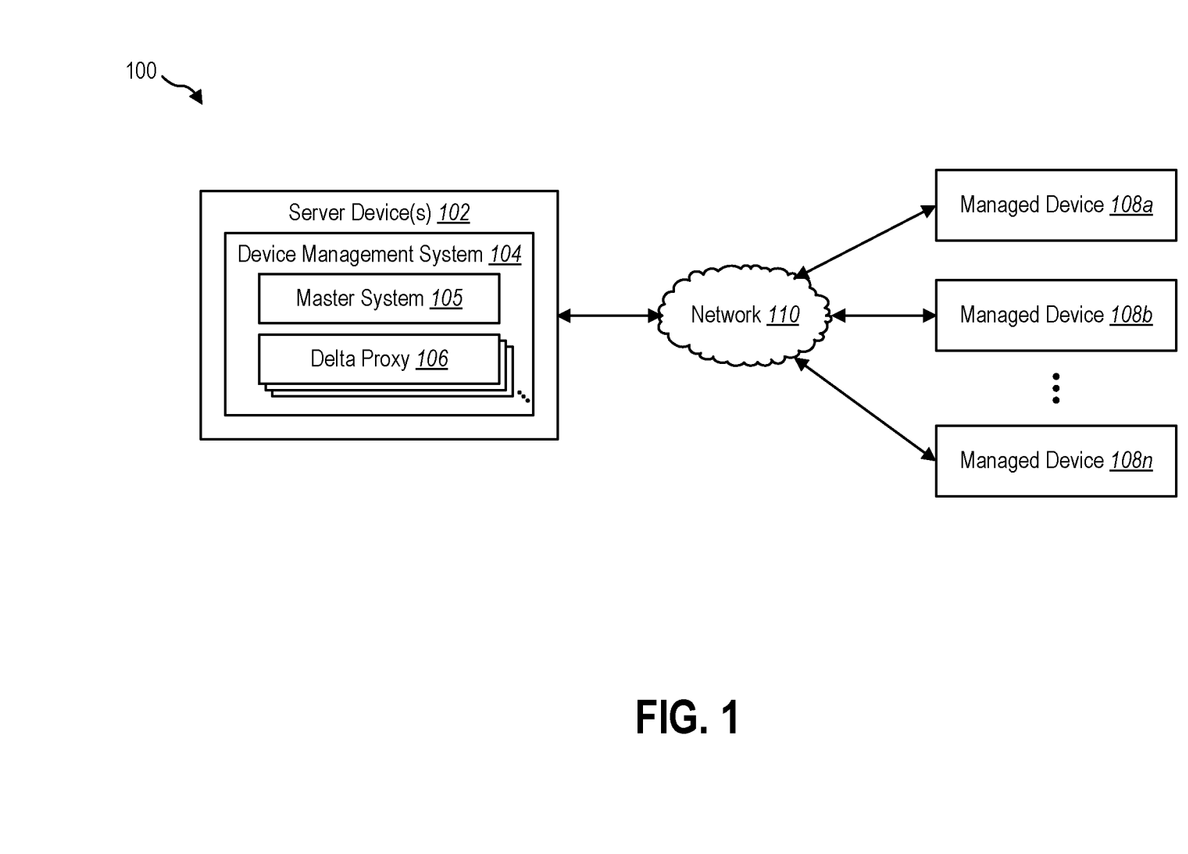
FIG. 1 illustrates an example environment in which a device management system that implements delta proxies for controlling managed devices can operate in accordance with one or more embodiments.

Additional detail will now be provided regarding an environment including the device management system in relation to illustrative figures and example embodiments. For example, FIG. 1 illustrates an example environment 100 for implementing a device management system for controlling a collection of managed devices via one or more delta proxies implemented on the device management system. As shown in FIG. 1, the environment 100 includes a server device(s) 102 including a device management system 104 including a master system 105 and a number of delta proxies 106 implemented thereon. The example environment 100 further includes a collection of managed devices 108a-n.

As shown in FIG. 1, the server device(s) 102 and managed devices 108a-n can communicate with each other directly or indirectly over a network 110. The network 110 may include one or multiple networks and may use one or more communication platforms or technologies suitable for transmitting data. In one or more embodiments, the network 110 includes the Internet or World Wide Web. In addition, or as an alternative, the network 110 can include other types of communication networks as described below (e.g., in relation to FIG. 5).

As mentioned above, and as shown in FIG. 1, the environment includes managed devices 108a-n. The managed devices may refer to various types of computing or electronic devices. For example, one or more of the managed devices 108a-n may refer to dumb terminals or thin clients including electronic devices having limited processing capabilities. For instance, a dumb terminal may refer to a managed device without a processor, microprocessor, or other hardware component that enables the managed device to process an escape sequence (e.g., a sequence of two or more characters). Alternatively, one or more of the managed devices 108a-n may include intelligent devices including more complex processing capabilities (e.g., having the capability to process an escape sequence) by way of a processor, microprocessor, or other more complex components thereon.

In one or more embodiments described herein the managed devices 108a-n may refer to any number and types of electronic or computing devices having a wide range of functionality. For example, the managed devices 108a-n can include devices ranging from simple such as oil sensors or thermostats to more complex devices such as network switches or computing devices including complex processors and memory thereon. Moreover, the managed devices 108a-n may have a variety of interfaces including, by way of example, a secure shell (SSH) interface, a Telnet interface, a representational state transfer (REST) interface, or other type of device or program interface. Indeed, one or more of the managed devices 108a-n may include a software agent associated with the device management system 104 installed thereon that augments control of features or configuration settings of a respective managed device.

As mentioned above, and as further shown in FIG. 1, the server device(s) 102 can generate, store, receive, and/or transmit any type of data, including control commands, management policies, and other related information. In one or more embodiments, the server device(s) 102 may include data servers. Indeed, the delta proxies may be implemented on the same or other data servers that make up the server device(s) 102. The server device(s) 102 can also include communication server or web-hosting servers. In one or more embodiments, the server device(s) 102 refers to a computing device and/or server device that provides administrative control to any number of managed devices 108a-n. Additional detail regarding server devices and some types of managed devices is provided below (e.g., in relation to FIGS. 4-5).

As shown in FIG. 1, the device management system 104 can include a master system 105 implemented on the server device(s) 102. The master system 105 may generate and provide commands for controlling the managed devices 108a-n. As an example, the master system 105 may implement settings or instructions for implementing the remote operation of the managed devices 108a-n. Alternatively, in one or more embodiments, the master system 105 receives one or more user commands (e.g., from an administrative device over a particular group of managed devices) and generates instructions or commands for implementing functionality of the managed devices 108a-n in accordance with the received one or more user commands.

As further shown, the device management system 104 includes a plurality of delta proxies 106 implemented on the server device(s) 102. As mentioned above, the delta proxies 106 may provide an interface over which the master system 105 can communicate commands for managing or otherwise controlling functionality of the managed devices 108a-n. As will be described in further detail below, the delta proxies 106 can include a number of interfaces and layers that enable one or more individual instances of the delta proxies 106 to control functionality of multiple managed devices 108a-n. As mentioned above, the delta proxies 106 can include plug-ins that normalizes data (e.g., commands) provided by the master system 104 for communicating operating instructions to the managed devices 108a-n in a way that is transparent from the perspective of the master device 105.

Although FIG. 1 illustrates a particular number and arrangement of delta proxies 106 and managed devices 108a-n, it will be understood that the environment 100 can include any number of devices, including any number of server devices or managed devices. Moreover, one or more of the managed devices 108a-n may communicate with the server device 102 via an alternative network, bypassing the network 110. For example, in one or more embodiments, the server device(s) 102 may communicate with a first managed device 108a over the network 110 while communicating with a second managed device 108b over an alternative network (e.g., using a similar or different type of network).

Figure 2:
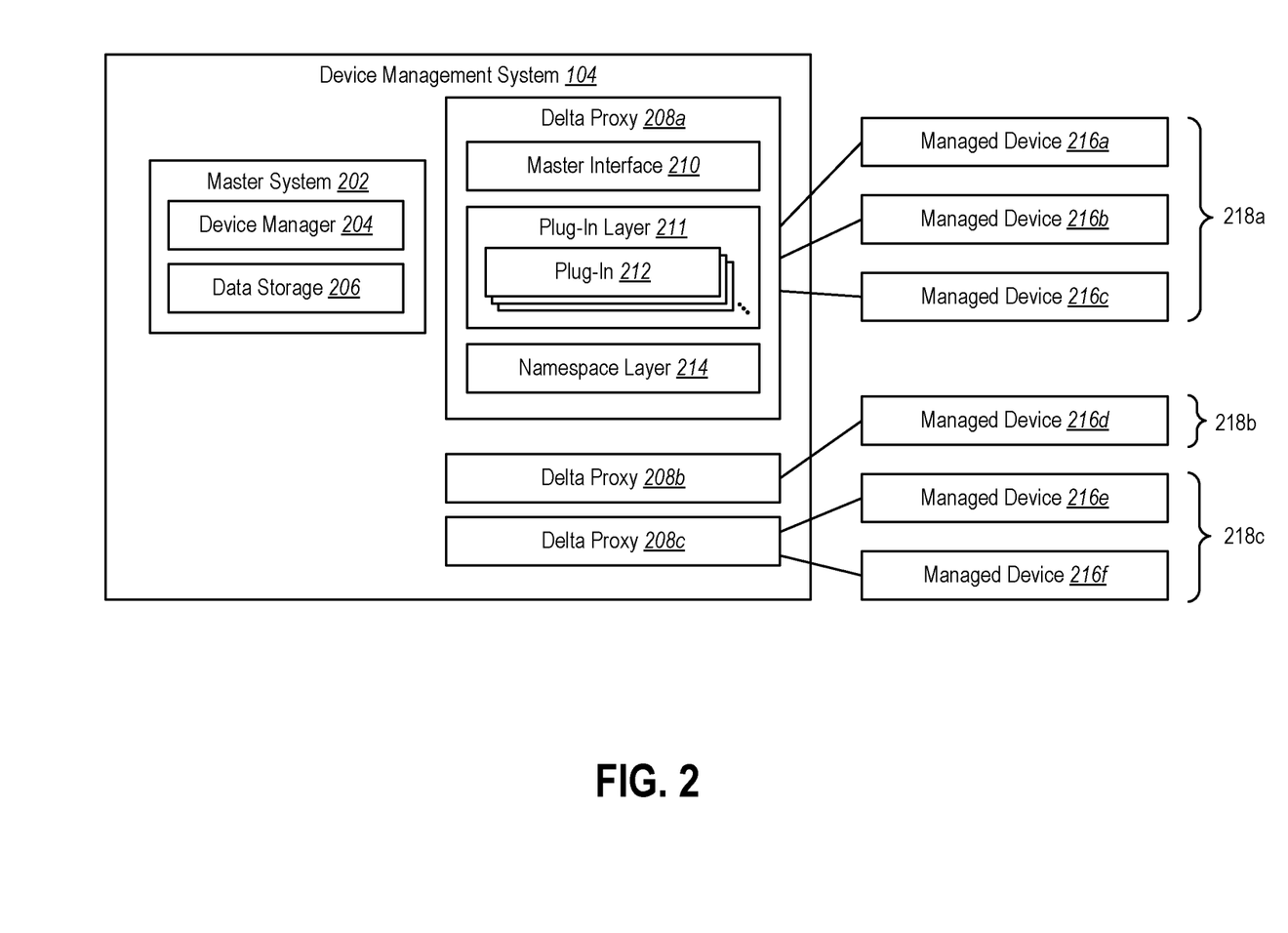
FIG. 2 illustrates an example implementation of a device management system including multiple delta proxies for controlling a plurality of managed devices in accordance with one or more embodiments.

FIG. 2 illustrates a more detailed example of a device management system 104 in accordance with one or more embodiments described herein. In particular, as shown in FIG. 2, the device management system 104 includes a master system 202 including a device manager 204 and a data storage 206 implemented thereon. Further, the device management system 104 includes delta proxies 208a-c configured to control one or multiple managed devices 218a-f. As shown in FIG. 2, a first delta proxy 208a includes a master interface 210, a plug-in layer 211 including multiple plug-ins 212, and a namespace layer 214. For ease in explanation, the master interface, plug-in layer 211, plug-ins 212, and namespace layer 214 are shown in connection with the first delta proxy 208a. Nevertheless, it will be appreciated that the additional delta proxies 208b-c may include similar components for implementing similar features and functionality as the first delta proxy 208a.

As shown in FIG. 2, the master system 202 may include a device manager 204 and a data storage 206. For generating and providing various commands to be executed by the managed devices 212a-f. In one or more embodiments, the device manager 204 includes a module (e.g., a software module or software instance) that interacts with one or more computing devices (not shown) to receive instructions for operating any number of the managed devices 218a-f. As an example, the device manager 204 may provide data via a display interface to an administrator (e.g., an administrative device) that enables a user to indicate operating parameters or settings for the managed devices 218a-f to implement via the delta proxies 208a-c.

As further shown, the master system 202 includes a data storage 206 including a storage space on which the device manager 204 can store and/or access data for generating commands. For example, the data storage 206 can include account data (e.g., for an administrative user), device data (e.g., unique identifiers for the managed devices 218a-f) or other information that enables the master system 202 to generate and provide commands for one or more identified managed devices 208a-f.

As an example, the master system 202 can generate a command for controlling a functionality of a first managed device 218a including an identification of the first managed device 218a as well an instruction for activating a functionality of the managed device 218a. In one or more embodiments, the master system 202 generates one or more commands to invoke functionality of multiple managed devices (e.g., a first device group 218a including devices of a similar type or that share a similar set of functional features).

Upon generating a command or instructions to invoke functionality of one or more managed devices, the master system 202 can provide the command and/or other data to a delta proxy associated with the managed device and/or functionality indicated within the command. Indeed, as mentioned above, because the delta proxy facilitates control of functionality of a group of managed devices in a manner that is transparent to the master system 202, the master system 202 can generate and provide a command to the delta proxy without providing any additional input for normalizing the command prior to providing the command to one or more managed devices associated with the command. Indeed, from the perspective of the master system 202, the master system 202 communicates data to the delta proxy in the same way as the master system 202 would communicate with a conventional software instance or program configured to control a single device in accordance with conventional systems mentioned above. The delta proxy can then normalize the command for transmission to one or more corresponding managed devices in such a way as the command is compatible with the managed devices and in a manner that is transparent to the master system 202.

As shown in FIG. 2, a first delta proxy 208a includes a master interface 210 to facilitate communication between the first delta proxy 208a and the master system 202. For example, upon receiving a command generated by the master system 202, the master interface 210 can be used to interpret the instructions included within the command to determine one or more functionalities and/or managed devices invoked by the command. In one or more embodiments, the master interface 210 is used to determine which of the delta proxies 208a-c should handle the command. For example, the master interface 210 may identify one or more specific managed devices and/or functionalities invoked by the command and identify one or more plug-ins associated with the device and/or functionality.

While the device management system 104 shown in FIG. 2 illustrates an example in which each of the delta proxies 208a-c may include a master interface 210 implemented thereon, in one or more embodiments, the device management system 104 includes a master interface to facilitate communication between the master system 202 and each of the delta proxies 208a-c. For example, in one or more embodiments, a master interface can receive a command from the master system 202 and provide the command to one of the delta proxies 208a-c associated with a managed device or group of managed devices invoked by the command.

As shown in FIG. 2, the first delta proxy 208a includes a number of plug-ins 212 including software components (e.g., code) layered on the software instance of the first delta proxy 208a. The plug-ins provide additional functionality with respect to one or more devices controlled by the master system 202 via the delta proxy. For example, the plug-ins 212 on the first delta proxy 208a may include code that enables the first delta proxy 208a to normalize a command received from the master system 202 to transmit to one or multiple managed devices 218a-c from the first device group 218a.

In one or more embodiments, the plug-ins 212 facilitate asynchronous communication between the delta proxies 208a-c and the managed devices 216a-f. For example, by mapping or otherwise associating the plug-ins 212 of the plug-in layer 211 to different managed devices 216a-f, the device management system 104 provides a group 218 process including multiple input/output (I/O) bound routines running concurrently without the use of threading on an operating system. Accordingly, where conventional systems deploy individual proxies to manage a single I/O connection for a single device having a specific interface, layering multiple plug-ins 212 within a single plug-in layer 211 of a delta proxy 208a enables the delta proxy 208a to process multiple I/O routines running concurrently on different managed devices (e.g., managed devices 216a-c). Furthermore, by asynchronously communicating with the different devices, the disparity between the I/O connections does not interface with the operation of other devices in communication with the same delta proxy.

As discussed above, the plug-ins 212 include code that enables a single instance of the first delta proxy 208a to control functionality of the first device group 218a including multiple managed devices 218a-c. In one or more embodiments, each of the plug-ins 212 correspond to a respective managed device 218a-c from the first device group 218a. For example, where the first device group 218a includes a set of three managed devices 216a-c, the first delta proxy 208a may include three plug-ins 212 including a plug-in for each of the respective managed devices 216a-c managed via the delta proxy 208a. Alternatively, as will be described in further detail below in connection with FIG. 3, one or more of the plug-ins 212 may be used to manage multiple devices using a single plug-in (e.g., one or more devices of a similar device type or having a similar set of functions).

As further shown in FIG. 2, the first delta proxy 208a includes a namespace layer 214. The namespace layer 214 may include a record of namespace data including unique identifiers for the managed devices 216a-f and an identification of memory or namespaces (e.g., on the data storage 206 of the master system 202) corresponding to each of the managed devices 216a-f. In one or more embodiments, each of the delta proxies 208a-c include a corresponding namespace layer, such as the namespace layer 214 implemented on the first delta proxy 208a that includes namespace data for the device group 218a specifically associated with the first delta proxy 208a. Alternatively, in one or more embodiments, the delta proxies 208a-c share or otherwise utilize a namespace layer including namespace data that identifies or otherwise indicates an allocation of memory assigned to each of the managed devices 216a-c from the first device group 218a.

In generating or maintaining the namespace layer 214, plug-ins layered on a delta proxy may create or otherwise identify namespaces for managed devices corresponding to the delta proxy. In particular, rather than relying solely on the master system 202 to allocate namespaces for each instance of software configured to control functionality of a specific managed device, the device management system 104 can instead implement a separate layer on a delta proxy that remaps memory namespaces for the managed devices associated with the delta proxy. Accordingly, even where the master system 202 may initially delegate a namespace for a managed device, the delta proxy 208a may implement a namespace layer 214 for mapping, remapping, or otherwise maintaining namespaces for each of the managed devices 216a-c from the first device group 218a controlled via the first delta proxy 208a.

By organizing the namespace data using this architecture, the device management system 104 can significantly reduce namespace and memory bleeding common in conventional systems that attempt to control functionality of a significant number of managed devices. For example, where a master system 202 is an open-source or other established system that does not allow memory isolation, the device management system 104 may nonetheless achieve memory isolation for devices controlled by the master system 202 by implementing the namespace layer 214 at the proxy level which remaps namespace data on a per-device (or per-plug-in) basis for those devices associated with one or more delta proxies. Thus, the device management system 104 avoids problems with connections overlapping or functionalities getting mixed, which may cause managed devices to operate erroneously.

As shown in FIG. 2, the managed devices 216a-f are organized by device groups 218a-c. For example, a first device group 218a includes a first set of managed devices 216a-c controlled via the first delta proxy 208a. A second device group 218b includes a managed device 216d managed by the second delta proxy 208b. The third device group 218c includes managed devices 216e-f managed by the third delta proxy 208c. It will be understood that FIG. 2 illustrates example groups of managed devices and that the device management system 104 can utilize each of the delta proxies 208a-c to control any number of associated managed devices.

Moreover, as mentioned above, the device management system 104 can add or remove one or more managed devices to or from a corresponding delta proxy. For example, the device management system 104 can add an additional managed device to the first device group 218a by layering an additional plug-in to the plug-in layer 211 of the first delta proxy 208a in addition to the plug-ins 212 already implemented thereon. Indeed, the device management system 104 can layer the additional plug-in to the first delta proxy 208a without rebooting or restarting the first delta proxy 208a and without interrupting operation of other devices managed by the first delta proxy 208a.

The device management system 104 can additionally remove one or more managed devices from control by the delta proxy without interrupting functionality of other managed devices and/or rebooting or restarting the delta proxy. For example, to remove the first managed device 216a from the first device group 218a associated with the first delta proxy 208a, the device management system 104 can delete or de-activate a plug-in associated with the first managed device 216a without restarting or rebooting the first delta proxy or otherwise interrupting the other managed devices within the first device group 218a. In addition, because the namespace layer 214 includes non-overlapping memory allocations, namespace data for the first managed device 216a can be removed (or non-allocated) without affecting or interrupting functionality of the other managed devices from the first device group 218a.

As further shown in FIG. 2, the groupings of managed devices 216a-f may be determined in a variety of ways. For example, in one or more embodiments, each of the device groups 218a-c are organized by device-type. For instance, the first device group 218a may include a set of managed devices of a particular type (e.g., thermostats) or a set of managed devices having a common set of functionalities (e.g., dumb terminals with a very limited set of discrete functionalities). As shown in FIG. 2, the second device group 218b may include a single managed device where the managed device includes a unique set of functionalities or includes proprietary software difficult to group together with other managed devices. As further shown, the third device group 218c may include another set of managed devices of a different type or having a different set of functionalities as the other devices managed by other delta proxies of the device management system 104.

In one or more embodiments, rather than organizing the managed devices 216a-f by device-type or based on functionalities of the devices, the device management system 104 can organize the device groups (e.g., implement different delta proxies or plug-ins for different groups of devices) for similar device-types that are configured to operated differently. For example, the device management system 104 can identify a first group of devices based on a set of configuration settings for the first group of managed devices and identify a second group of similar devices (e.g., devices of the same device-type) having a different set of configuration settings, and therefore configured to operate differently than the first set of devices.

By grouping the managed devices by device type, functionality, or configuration settings, the device management system 104 facilitates providing commands to particular groups of managed devices by way of a single communication or command. For example, the master system 202 may generate a command to detect a present-state of all sensors of a particular group of sensors. A delta proxy or plug-in associated with the group can normalize the command and provide the command to all sensors from the group using minimal processing resources of the device management system 104 while effectively relaying the command to the target group of devices.

Figure 3:
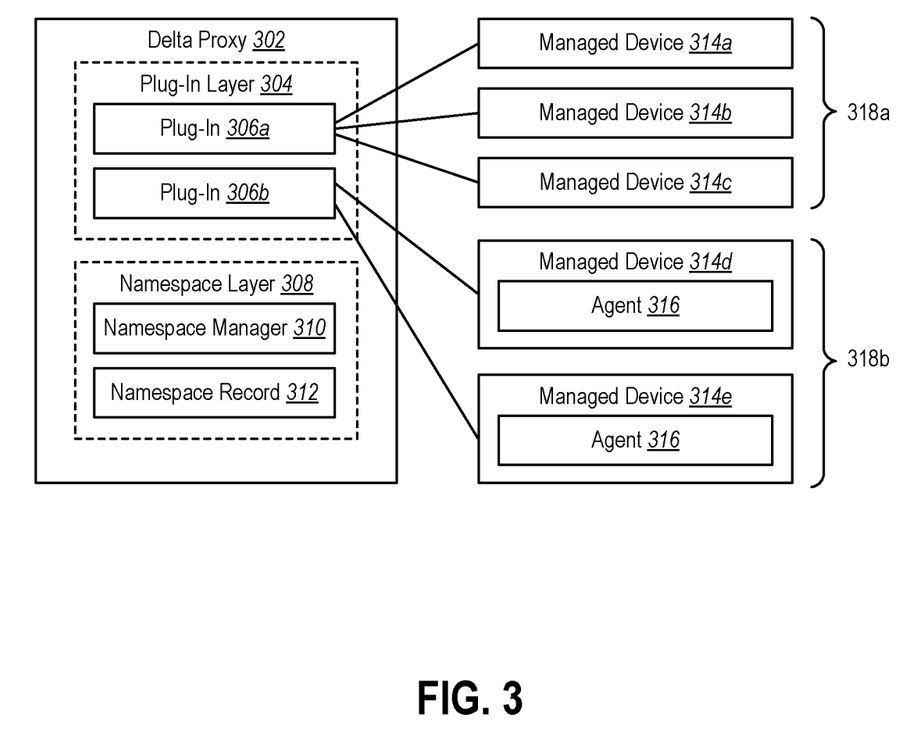
FIG. 3 illustrates an example delta proxy including software plug-ins implemented thereon for controlling multiple groups of managed devices in accordance with one or more embodiments.

FIG. 3 illustrates one or more additional features and functionality of a delta proxy implemented by the device management system 104 in accordance with one or more embodiments. In particular, FIG. 3 illustrates an example delta proxy 302 including a plug-in layer 304 and a namespace layer 308. The plug-in layer 304 and namespace layer 308 can include similar features as described in connection with corresponding components of the device management system 104 described above. As further shown, the delta proxy 302 can control a plurality of managed devices 314a-e including similar features and functionality as other managed described herein. Indeed, similar to one or more embodiments described above, the delta proxy 302 can control the plurality of managed devices 314a-e by way of a single instance of the delta proxy 302.

As shown in FIG. 3, the plug-in layer 304 includes a number of plug-ins 306a-b including discrete software components (e.g., code) layered on the delta proxy 302. As further shown, each of the plug-ins 306a-b may be associated with respective device groups 318a-b of the plurality of managed devices 314a-e. For example, the first plug-in 306a may be used to control a first device group 318a including managed devices 314a-c. In addition, the second plug-in 306b may be used to control a second device group 318b including managed devices 314d-e.

In one or more embodiments, the device groups 318a-b refer to subsets of the plurality of managed devices 314a-e corresponding to different device types or managed devices having different sets of functionality. As an example, the first device group 318a may include a set of dumb terminals having a limited set of functions. In contrast, the second device group 318b may include a set of terminals having processors thereon capable of processing more complex instructions. Indeed, as shown in FIG. 3, the second device group 318b includes a set of managed devices 314d-e including software agents 316 thereon. In one or more embodiments, the agents 316 refer to software programs associated with the device management system 104.

As used herein, the agent 316 may refer to an active software agent installed on a managed device capable of maintaining an active connection with the device management system 104 (e.g., with an associated delta proxy) and implementing instructions received from the device management system 104. For example, in one or more embodiments, the agent 316 is configured to manage configuration settings on a managed device by controlling settings or applications that affect operation of the managed device. Accordingly, upon receiving a command from a master system 105, a second plug-in 306b associated with the second device group 318b including managed devices 314d-e having the agent 316 thereon can normalize the command and provide data to the agent 316 for implementation of the command on the managed devices 314d-e.

While the plug-ins 306a-b may be configured to control each of the managed devices 314a-e individually, in one or more embodiments, a single plug-in controls a set of managed devices associated with the plug-in as a group. For example, where the first device group 318a includes a set of thermostats for an organization (e.g., a hotel), the master system 105 may issue a command for all thermostats to maintain a temperature of 72 degrees. In response, the first plug-in 306a can normalize the command(s) and transmit a normalized command to each of the thermostats to execute the command by activating functionality on each of the respective thermostats.

As further shown in FIG. 3, the namespace layer 308 includes a namespace manager 310 and a namespace record 312. Similar to one or more embodiments described above, the namespace layer 308 can partition memory on a per-device basis to avoid overlapping of memory used in operating different managed devices. For example, in one or more embodiments, the namespace manager 310 receives a device identifier for each of the managed devices 314a-e and identifies a namespace or region of memory (e.g., on the master system) to use in controlling functionality of the respective managed devices. In addition, in one or more embodiments, the namespace manager 310 identifies a namespace or region of memory corresponding to each of the plug-ins 306a-b (e.g., rather than or in addition to each managed device). The namespace manager 310 can maintain a namespace record 312 including mapping information corresponding to the identified regions of memory associated with the managed devices or plug-ins. For example, the namespace record 312 can include mapping information that maps unique identifiers for the managed devices 314a-e to corresponding allocations or regions of memory in use for controlling the functionality of the managed devices 314a-e.

By grouping the managed devices with corresponding plug-ins in accordance with device-type or set of functions, the device management system 104 can flexibly add any number of managed devices to the plurality of managed devices 314a-e for control by the delta proxy 302. For example, where another managed device is added to an environment or system of devices in control by the device management system 104 that is the same device-type or has a similar set of functionality as the first device group 318a, the device management system 104 can add the new device to the delta proxy 302 and activate the new device with the first plug-in 306a without modifying the code of the plug-in, restarting the delta proxy 302, or otherwise interrupting operation of the other managed devices from the first device group 318a. In addition, the namespace manager 310 can add an identifier for the new device to the namespace record 312 and allocate any additional memory needed for controlling functionality of the new device to prevent potential conflicts with other devices controlled by the device management system 104.

As an illustrative example, upon identifying a managed device to control by the device management system 104, the device management system 104 may first identify a device-type (e.g., a brand, model, or version of the device) and/or determine a set of functions that the device is configured to perform. Where the device management system 104 determines that the device-type or set of functionality associated with the device matches or otherwise corresponds with a device group associated with a plug-in on the delta proxy, the device management system 104 can associate the new device to the existing plug-in. The device management system 104 can additionally allocate memory for the new device and store a record of mapping information between a unique identifier of the new device and a namespace (e.g., allocation of memory) for controlling functionality of the new device. Similarly, when adding a new plug-in to a delta proxy, the device management system 104 can allocate memory for the new plug-in.

Each of the examples described above in connection with FIGS. 1-3 include components and capabilities of an example architecture for implementing a device management system 104 in accordance with one or more embodiments described herein. These examples are intended as exemplary, and components described in the examples above may be implemented in whole or in part on the server device(s) 102 or may be implemented across multiple devices (e.g., the server device(s) 102 and one or more managed devices.

In addition, the components described as part of the device management system 104 can include software, hardware, or both. For example, components of the device management system 104 described in connection with FIGS. 1-3 can include one or more instructions stored on a computer-readable storage medium and executable by processors of one or more server devices. When executed by one or more processors, the computer-executable instructions of the device management system 104 can perform the features and functionalities described herein related to controlling operation or otherwise managing a number of devices. Alternatively, the components of the device management system 104 can include hardware, such as a special purpose processing device to perform certain functions or groups of functions. Additionally, the components of the device management system 104 can include a combination of computer-executable instructions and hardware.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable storage medium and executable by one or more computing devices (e.g., any of the media content access devices described herein). In general, a processor (e.g., a microprocessor) receives instructions, from a non-transitory computer-readable storage medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 4:
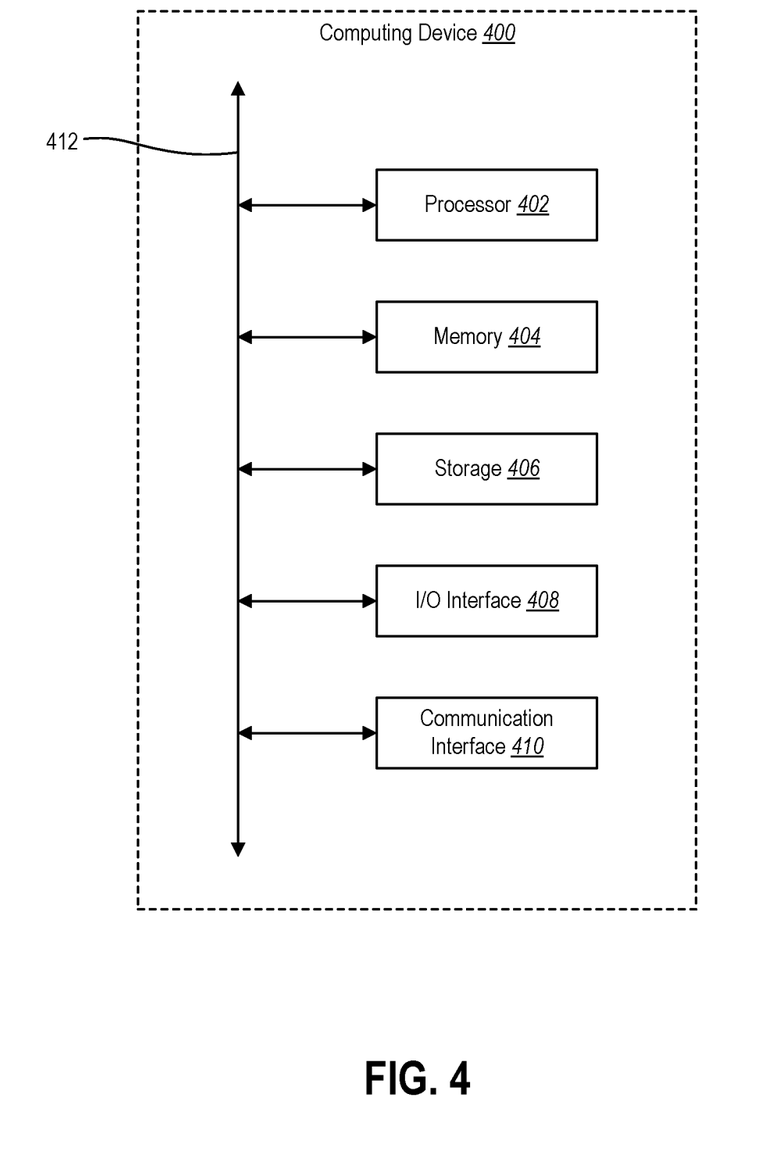
FIG. 4 illustrates a block diagram of a computing device in accordance with one or more embodiments.

FIG. 4 illustrates a block diagram of an example computing device 400 that may be configured to perform one or more of the processes described above. One will appreciate that one or more computing devices, such as the computing device 400 may represent the computing devices described above in connection with one or more embodiments (e.g., managed devices and/or server devices. In one or more embodiments, the computing device 400 may be a mobile device (e.g., a mobile telephone, a smartphone, a PDA, a tablet, a laptop, a camera, a tracker, a watch, a wearable device, etc.). In some embodiments, the computing device 400 may be a non-mobile device (e.g., a desktop computer or another type of client device). Further, the computing device 400 may be a server device that includes cloud-based processing and storage capabilities.

As shown in FIG. 4, the computing device 400 can include one or more processor(s) 402, memory 404, a storage device 406, input/output interfaces 408 (or "I/O interfaces 408"), and a communication interface 410, which may be communicatively coupled by way of a communication infrastructure (e.g., bus 412). While the computing device 400 is shown in FIG. 4, the components illustrated in FIG. 4 are not intended to be limiting. Additional or alternative components may be used in other embodiments. Furthermore, in certain embodiments, the computing device 400 includes fewer components than those shown in FIG. 4. Components of the computing device 400 shown in FIG. 4 will now be described in additional detail.

In particular embodiments, the processor(s) 402 includes hardware for executing instructions, such as those making up a computer program. As an example, and not by way of limitation, to execute instructions, the processor(s) 402 may retrieve (or fetch) the instructions from an internal register, an internal cache, memory 404, or a storage device 406 and decode and execute them.

The computing device 400 includes memory 404, which is coupled to the processor(s) 402. The memory 404 may be used for storing data, metadata, and programs for execution by the processor(s). The memory 404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 404 may be internal or distributed memory.

The computing device 400 includes a storage device 406 includes storage for storing data or instructions. As an example, and not by way of limitation, the storage device 406 can include a non-transitory storage medium described above. The storage device 406 may include a hard disk drive (HDD), flash memory, a Universal Serial Bus (USB) drive or a combination these or other storage devices.

As shown, the computing device 400 includes one or more I/O interfaces 408, which are provided to allow a user to provide input to (such as user strokes), receive output from, and otherwise transfer data to and from the computing device 400. These I/O interfaces 408 may include a mouse, keypad or a keyboard, a touchscreen, camera, optical scanner, network interface, modem, other known I/O devices or a combination of such I/O interfaces 408. The touchscreen may be activated with a stylus or a finger.

The I/O interfaces 408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 408 are configured to provide graphical data to a display for presentation to a user. The graphical data may be representative of one or more graphical user interfaces and/or any other graphical content as may serve a particular implementation.

The computing device 400 can further include a communication interface 410. The communication interface 410 can include hardware, software, or both. The communication interface 410 provides one or more interfaces for communication (such as, for example, packet-based communication) between the computing device and one or more other computing devices or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI. The computing device 400 can further include a bus 412. The bus 412 can include hardware, software, or both that connects components of computing device 400 to each other.

Figure 5:
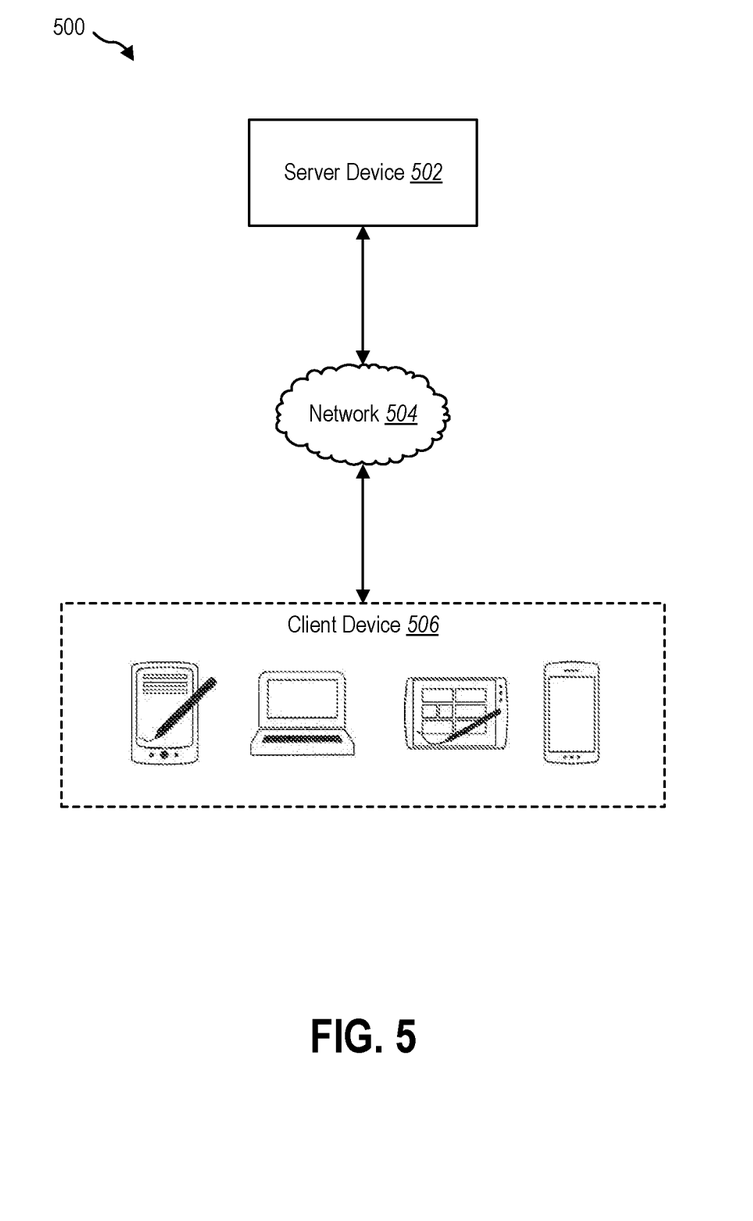
FIG. 5 illustrates a networking environment including a device management system in accordance with one or more embodiments.

FIG. 5 illustrates an example network environment 500 in accordance with one or more embodiments described herein. Network environment 500 includes a client device 506, and a server device 502 connected to each other by a network 504. Although FIG. 5 illustrates a particular arrangement of client system 506, server device 502, and network 504, this disclosure contemplates any suitable arrangement of client device 506, server device 502, and network 504. As an example, and not by way of limitation, two or more client devices 506 and the server device 502 may be connected to each other directly, bypassing network 504. As another example, two or more of client device 506 and server device 502 may be physically or logically co-located with each other in whole, or in part. Moreover, although FIG. 5 illustrates a particular number of client devices 506, server device(s) 502, and networks 504, this disclosure contemplates any suitable number of client devices 506, server device(s) 502, and networks 504. As an example, and not by way of limitation, network environment 500 may include multiple client devices 506, server device(s) 502, and networks 504.

This disclosure contemplates any suitable network 504. As an example and not by way of limitation, one or more portions of network 504 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 504 may include one or more networks 504.

Links may connect client device 506, and server device 502 to communication network 504 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 500. One or more first links may differ in one or more respects from one or more second links.

In particular embodiments, client device 506 may be an electronic device including hardware, software, or embedded logic components or a combination of two or more such components and capable of carrying out the appropriate functionalities implemented or supported by client device 506. As an example, and not by way of limitation, a client device 506 may include any of the computing devices discussed above in relation to one or more embodiments described herein. A client device 506 may enable a network user at client device 506 to access network 504. A client device 506 may enable its user to communicate with other users at other client systems.

In particular embodiments, client device 506 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 506 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 506 one or more Hyper Text Markup Language (HTML) files responsive to the HTTP request. Client device 506 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 502 may include a variety of servers, sub-systems, programs, modules, logs, and data stores. In particular embodiments, server device 502 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 502 may also include suitable components such as network interfaces, security mechanisms, load balancers, failover servers, management-and-network-operations consoles, other suitable components, or any suitable combination thereof.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system that enables a master control system to remotely control a plurality of managed devices, the system comprising a computing device that includes:

a master control system interface that facilitates communication between the computing device and the master control system, wherein the master control system is configured to generate commands for controlling operation of the plurality of managed devices, wherein the computing device receives the commands via the master control system interface, wherein the master control system interface identifies a set of software plug-ins from a plurality of software plug-ins that corresponds to a command from the commands;

a plug-in layer that includes the plurality of software plug-ins, wherein a software plug-in from the set of software plug-ins normalizes the command for compatibility based on a set of interfaces that correspond to a set of managed devices from the plurality of managed devices, wherein the set of managed devices corresponds to the software plug-in that normalizes the command, wherein the software plug-in transmits the normalized command to the set of managed devices; and a namespace layer that includes non-overlapping memory allocations for the plurality of managed devices, wherein the namespace layer includes a record of identifiers mapped to the non-overlapping memory allocations for the plurality of managed devices.

2. The system of claim 1, wherein the plug-in layer includes:

a first software plug-in to manage a first subset of managed devices from the set of managed devices, wherein the first software plug-in is from the set of software plug-ins; and a second software plug-in to manage a second subset of managed devices from the set of managed devices, wherein the second software plug-in is from the set of software plug-ins, wherein the second subset includes different managed devices from the first sub set.

3. The system of claim 2, wherein each managed device from the first subset is a first device type; and wherein each managed device from the second subset is a second device type, wherein the second device type is different from the first device type.

4. The system of claim 2, wherein the first subset includes a first set of configuration settings that corresponds to device features of the first subset; and wherein the second subset includes a second set of configuration settings that corresponds to device features of the second subset.

5. The system of claim 1, wherein the plug-in layer includes each software plug-in from the plurality of software plug-ins, wherein each software plug-in from the plurality of software plug-ins manages functionality of a corresponding managed device from the plurality of managed devices.

6. The system of claim 1, wherein the plug-in layer asynchronously communicates with the plurality of managed devices to control functionality of the plurality of managed devices in a manner that is transparent to the master control system.

7. The system of claim 1, wherein the plug-in layer normalizes a command from the master control system to be compatible with interfaces of two or more managed devices of the same type from the plurality of managed devices.

8. The system of claim 1, wherein the computing device allocates regions of memory on a per-device basis in accordance with the identifiers associated with discrete device types or discrete device functionalities from the plurality of managed devices and stores mapping information associating the regions of memory and the identifiers on the namespace layer of the computing device.

9. The system of claim 1, wherein the plurality of managed devices includes at least one dumb terminals capable of interpreting a limited number of control codes.

10. The system of claim 1, wherein at least one managed devices of the plurality of managed devices includes a software agent associated with the master control system implemented thereon configured to asynchronously communicate with the computing device to receive commands and implement functionality of the at least one managed devices in response to data received from the computing device.

11. The system of claim 1, wherein the computing device is configured to add a new device to the plurality of managed devices without interrupting functionality of the plurality of managed devices, wherein to add the new device includes the computing device to:
 identify the new device to control by the computing device; and
 load dynamically the new plug-in to the plug-in layer to facilitate communication between the computing device and the new device without restarting the computing device.

12. The system of claim 1, wherein the computing device is configured to add a new device to the plurality of managed devices without interrupting functionality of the plurality of managed devices, wherein to add the new device includes the computing device to:
 identify the new device to control by the single instance of the computing device;
 determine that the new device includes similar functionality as a different device from the plurality of managed devices; and
 associate, in response to the determination that the new device includes similar functionality as the different device from the plurality of managed devices, the new device with an existing software plug-in from the plurality of software plug-ins that corresponds with the different device without restarting the computing device.

13. The system of claim 1, wherein the master control system interface determines a set of functionality instructions based on the command, wherein the set of functionality instructions includes an activate configuration setting instruction and an activate operating instruction.

14. The system of claim 1, wherein the set of interfaces include device interfaces and program interfaces.

15. The system of claim 1, wherein the master control system interface determines a set of functionality instructions based on the command, wherein the set of functionality instructions includes a detect present-state of sensor instruction and a management policy instruction.

16. The system of claim 13, wherein the set of software plug-ins is identified based on the set of functionality instructions and a set of managed devices, wherein the set of software plug-ins include an indication of at least one function.

17. A system that enables a master control system to remotely control a plurality of managed devices, the system comprising a computing device that includes:
 a master control system interface that facilitates communication between the computing device and the master control system, wherein the master control system is configured to generate commands for controlling operation of the plurality of managed devices, wherein the computing device receives the commands via the master control system interface, wherein the master control system interface identifies a set of software plug-ins from a plurality of software plug-ins that corresponds to a command from the commands;
 a plug-in layer that includes the plurality of software plug-ins, wherein the a software plug-in from the set of software plug-ins normalizes the command for compatibility based on a set of interfaces that correspond to a set of managed devices from the plurality of managed devices, wherein the set of managed devices corresponds to the software plug-in that normalized the command, wherein the software plug-in transmits the normalized command to the set of managed devices, wherein the set of software plug ins include:
  a first software plug-in that facilitates communication between the computing device and a first subset of managed devices; and
  a second software plug-in that facilitates communication between the computing device and a second subset of managed devices; and
 a namespace layer that includes non-overlapping memory allocations for the plurality of managed devices, wherein the namespace layer includes a record of identifiers that identify regions of memory that correspond with discrete functionalities of the plurality of managed devices, wherein the regions of memory include a first region of memory associated with the first subset of managed devices controlled using the first software plug-in and a second region of memory associated the second subset of managed devices controlled using the second software plug-in.

18. The system of claim 17,
 wherein each managed device from the first subset is a first device type; and
 wherein each managed device from the second subset is a second device type, wherein the second device type is different from the first device type.

19. The system of claim 17,
 wherein each managed device from the first subset includes a first set of configuration settings; and
 wherein each managed device from the second subset includes a second set of configuration settings.

20. A system that enables a master control system to remotely control a collection of managed devices, the system comprising:
 a first computing device that includes:
  a first master control system interface that facilitates communication between the first computing device and the master control system, wherein the master control system is configured to generate first commands for controlling operation of a first plurality of managed devices having a first plurality of interfaces, and wherein the first computing device receives the first commands via the first master control system interface, wherein the first master control system interface identifies a first set of software plug-ins from a plurality of software plug-ins that corresponds to a first command from the first commands;

a first plug-in layer that includes a first plurality of software plug-ins, wherein a software plug-in from the first set of software plug-ins normalizes the first command for compatibility based on a first set of interfaces that correspond to a first set of managed devices from the first plurality of managed devices, wherein the first set of managed devices correspond to the software plug-in that normalized the command, wherein the first plug-in layer is configured to transmit the first normalized command to the first set of managed devices; and a first namespace layer that includes first non-overlapping memory allocations for the first plurality of managed devices, wherein the first namespace layer includes a first record of first identifiers mapped to the first non-overlapping memory allocations for the first plurality of managed devices; and a second computing device that includes:

a second master control system interface that facilitates communication between the second computing device and the master control system, wherein the master control system is configured to generate second commands for controlling operation of a second plurality of managed devices having a second plurality of interfaces, wherein the second computing device receives the second commands via the second master control system interface, wherein the second master control system interface identifies a second set of software plug-ins from a plurality of software plug-ins that corresponds to a second command from the second commands;

a second plug-in layer that includes a second plurality of software plug-ins, wherein a software plug-in from the second set of software plug-ins normalizes the second command for compatibility based on a second set of interfaces that correspond to a second set of managed devices from the second plurality of managed devices, wherein the second set of managed devices correspond to the software plug-in that normalized the command, wherein the second plug-in layer is configured to transmit second normalized command to the second set of managed devices; and a second namespace layer that includes second non-overlapping memory allocations for the second plurality of managed devices, wherein the second namespace layer includes a second record of second identifiers mapped to the second non-overlapping memory allocations for the second plurality of managed devices.

21. The system of claim 20, wherein each managed device from the first plurality of managed devices is a first device type; and wherein each managed device from the second plurality of managed devices is a second device type.

22. The system of claim 20, wherein each managed device from the first plurality of managed devices a includes a first set of configuration settings; and wherein each managed device from the second plurality of managed devices includes a second set of configuration settings.

\* \* \* \* \*